US008918647B1

(12) United States Patent
Wallrabenstein (10) Patent No.: US 8,918,647 B1
(45) Date of Patent: Dec. 23, 2014

(54) AUTHENTICATION SYSTEM

(71) Applicant: Sypris Electronics, LLC, Tampa, FL (US)

(72) Inventor: John Ross Wallrabenstein, West Lafayette, IN (US)

(73) Assignee: Sypris Electronics, LLC, Tampa, FL (US)

( * ) Notice: Subject to any disclaimer, the term of this patent is extended or adjusted under 35 U.S.C. 154(b) by 0 days.

(21) Appl. No.: 14/270,423

(22) Filed: May 6, 2014

Related U.S. Application Data

(63) Continuation of application No. 14/103,599, filed on Dec. 11, 2013.

(60) Provisional application No. 61/902,283, filed on Nov. 10, 2013.

(51) Int. Cl.
*G06F 21/00* (2013.01)
*H04L 29/06* (2006.01)

(52) U.S. Cl.
CPC .................................. *H04L 63/0853* (2013.01)
USPC .......................................... 713/172; 713/159

(58) Field of Classification Search
CPC ..... G06F 21/30; H04L 9/0866; H04L 9/3207; H04L 9/3218; H04L 9/3221; H04L 9/3278
USPC ............................ 726/5, 6; 713/172, 174, 159
See application file for complete search history.

(56) References Cited

U.S. PATENT DOCUMENTS

| 2008/0069341 | A1* | 3/2008 | Relyea ............................ 380/30 |
| 2009/0083833 | A1* | 3/2009 | Ziola et al. ........................ 726/2 |
| 2010/0031065 | A1* | 2/2010 | Futa et al. ...................... 713/194 |

OTHER PUBLICATIONS

Frikken et al., Robust Authentication Using Physically Unclonable Functions, 2009.*
Nguyen et al., Distribution of Modular Sums and the Security of the Server Aided Exponentiation, 2001.*

* cited by examiner

*Primary Examiner* — Edward Zee
(74) *Attorney, Agent, or Firm* — Law Office of Thomas J. Brindisi (57) ABSTRACT

A device authentication system including one or more devices, child servers capable of communicating therewith, and a root server configured to enroll devices by: collecting device-specific tokens and creating a complete verification set ("CVS") therefrom; creating a working verification set ("WVS") by selecting a subset of the CVS; creating a limited verification set ("LVS") by performing a derivation function on at least part of the WVS; and distributing part or all of the LVS to child servers. A device authentication system configured such that a PUF-containing device and a server communicating with the device can perform an extended BPV generation. A device authentication system that includes a device containing a PUF and is configured to perform error decoding on subsets of an authentication-related value multiple times.

30 Claims, 4 Drawing Sheets

Enrollment and Authentication Overview

Fig. 1 Enrollment and Authentication Overview

Fig. 2 Enrollment Derivation Tree

Fig. 3 Experimental Setup

Fig. 4 Overlapping Error Distributions

Fig. 5 Separated Error Distributions

Fig. 6 True (Observed) Error Distributions

US 8,918,647 B1

AUTHENTICATION SYSTEM

CROSS REFERENCE TO RELATED APPLICATIONS

This application is a continuation of application Ser. No. 14/103,599 filed Dec. 11, 2013, and claims the benefit of provisional application Ser. No. 61/902,283 filed Nov. 10, 2013, both of which applications are incorporated by reference here. The contents of U.S. Patent Application Publication No. 2013/0212642 and Applicant's co-pending U.S. patent application Ser. No. 13/829,826 are also incorporated here by reference, in particular their disclosure of a Resilient Device Authentication System, with which suitable embodiments of the system described herein can be used.

FIELD OF THE INVENTION

This disclosure relates generally to hardware verification, and in particular but not exclusively, to binding authentication to protect against tampering and subversion by substitution.

BACKGROUND OF THE INVENTION

The unique properties of PUFs provide several advantages over traditional public key infrastructure (PKI) constructions. In general, PUFs provide two core properties: tamper detection for a larger circuit, and to act as a noisy random oracle. The first property follows from the physical design of the PUF itself. As the PUF relies on uncloneable hardware tolerances (e.g. wire delays, resistance, etc.), any modification to either the PUF or the attached integrated circuit will irreversibly alter the PUF's mapping from challenges to responses. The second property is assumed in ideal theoretical models, where PUFs are treated as oracles that provide (noisy) responses to challenges, where the mapping between challenges and responses cannot be modeled or duplicated in hardware. Rührmair et al. ("Modeling attacks on physical uncloneable functions," *Proceedings of the 17th ACM conference on Computer and Communications Security*, CCS'10, pages 237-249, New York, 2010, ACM ("Rührmair I")) have refuted the claim of modeling robustness, and propose a hardware construction resilient to such attacks (Rührmair et al., "Applications of high-capacity crossbar memories in cryptography," *IEEE Trans. Nanotechnology*, 10(3):489-498, May 2011 ("Rührmair II")). Thus, theoretical constructions assuming that PUFs cannot be modeled remain interesting, as existing PUF hardware can be replaced with Rührmair et al.'s (Rührmair II) proposed design.

Literature on physically uncloneable functions (PUFs) evaluates the properties of PUF hardware design (e.g., Gassend et al., "Silicon physical random functions," *Proceedings of the 9th ACM conference on Computer and Communications Security*, CCS'02, pages 148-160, New York, 2002, ACM.; Katzenbeisser et al., "PUFs: Myth, fact or busted? A security evaluation of physically uncloneable functions (PUFs) cast in Silicon," *CHES*, pages 283-301, Springer, 2012; Ravikanth, "Physical One-Way Functions," Ph.D. Thesis, 2001; Rührmair II; Suh et al., "Physical Uncloneable Functions for Device Authentication and Secret Key Generation," *Proceedings of the 44th Annual Design Automation Conference*," DAC'07, pages 9-14, New York, 2007, ACM; Yu et al., "Recombination of Physical Uncloneable Functions," *GOMACTech*, 2010 ("Yu I")), provides formal theoretical models of PUF properties, and designs protocols around those definitions (cf. Armknecht et al., "A formalization of the security features of physical functions," *Proceedings of the 2011 IEEE Symposium on Security and Privacy*, SP'11, pages 397-412, Washington, D.C., 2011; Brzuska et al., "Physically uncloneable functions in the universal composition framework," *Advances in Cryptology—CRYPTO 2011—31st Annual Cryptology Conference*, vol. 6841 of *Lecture Notes in Computer Science*, page 51, Springer, 2011; Frikken et al., "Robust authentication using physically uncloneable functions," *Information Security*, vol. 5735 of *Lecture Notes in Computer Science*, pages 262-277, Springer Berlin Heidelberg, 2009; Handschuh et al., "Hardware intrinsic security from physically uncloneable functions," *Towards Hardware-Intrinsic Security*, Information Security and Cryptography, pages 39-53, Springer Berlin Heidelberg, 2010; Kirkpatrick et al., "PUF ROKs: A hardware approach to read-once keys," *Proceedings of the 6th ACM Symposium on Information, Computer and Communications Security*, ASIACCS'11, pages 155-164, New York, 2011, ACM; Paral et al., "Reliable and efficient PUF-based key generation using pattern matching," *Hardware-Oriented Security and Trust (HOST), 2011 IEEE International Symposium*, pages 128-133 June 2011; Rührmair et al., "PUFs in Security Protocols: Attack Models and Security Evaluations," 2013 *IEEE Symposium on Security and Privacy*, pages 286-300, 2013 ("Rührmair III"); van Dijk et al., "Physical Uncloneable Functions in Cryptographic Protocols: Security Proofs and Impossibility Results," *Cryptology ePrint Archive*, Report 2012/228, 2012; Wu et al., "On foundation and construction of physical uncloneable functions," *Cryptology ePrint Archive*, Report 2010/171, 2010; Yu et al., "Lightweight and Secure PUF Key Storage using limits of Machine Learning," *Proceedings of the 13th International Conference on Cryptographic Hardware and Embedded Systems*, CHES'11, pages 358-373, Berlin, Heidelberg, 2011, Springer-Verlag ("Yu II")).

Ravikanth introduced the notion of physical one-way functions in his Ph.D. dissertation. The physical construction is based on optics, using the speckle pattern of a laser fired through a semi-transparent gel to construct an uncloneable and one-way function. This seminal work led to more realistic constructions of physically uncloneable functions (PUFs) that did not rely on precise mechanical alignment and measurements.

Gassend et al. introduce the notion of PUFs constructed through integrated circuits. This work improves upon the original physical one-way function construction using optics by Ravikanth by removing the precise requirements necessary for mechanical alignment and output measurement. By implementing PUFs in integrated circuits, the hardware is widely available, and easy to integrate into existing systems.

Suh et al. introduced the ring oscillator construction of a PUP, which has many desirable properties. Specifically, the ring oscillator design is easy to implement in hardware, robust, and unpredictable. The authors demonstrate that ring oscillator constructions exhibit 46% inter-chip variation, yet have only 0.5% intra-chip variation.

Rührmair II describe a candidate direction to alleviate the problems with existing PUF constructions demonstrated in Rührmair I. They introduce the notion of a super high information content (SHIC) PUF. A SHIC-PUF contains a large amount of information (e.g. $10^{10}$ bits) while having a self-imposed slow readout rate that is not circumveritable by construction. Thus, if an adversary attempts to acquire the full challenge-response pair set, the time required to achieve this would exceed the lifetime of the device. Using lithographic crossbar memory, a small PUF would require at least three years of continuous reading to fully model. As nanotechnology develops, the promise of a nonlithographic crossbar ($\approx$10-nm) would require decades to fully model. Thus, the security of the SHIC-PUF is independent of the computational abilities of the adversary and inherently linked to the physical construction. Further, the crossbar can be used as an overlay PUF, which protects the underlying circuitry.

Yu I describe PUF constructions that treat the unique hardware characteristics of devices as genetic material. Similar to genetic recombination, these properties may be recombined to produce output with different characteristics than the original material. In the authors' construction, a PUF may be altered to provide NIST certifiable random output, an exponential challenge space and real-valued outputs. True random output is a necessary characteristic for use in cryptographically strong authentication protocols. The real valued output facilitates soft decision error correction, where both the signal and strength are reported (Yu et al., "Secure and Robust Error Correction for Physical Unclonable Functions," *IEEE Des. Test*, 27 (1):48-65, January 2010, ("Yu III")). Finally, the authors also demonstrate how to construct a multi-modal PUF, with separate generation and authentication modes.

Katzenbeisser et al. evaluate the assumed properties of various PUF constructions, finding that many lack essential characteristics of an ideal PUF. The arbiter, ring oscillator, SRAM, flip-flop and latch PUF constructions are compared for robustness and unpredictability in varying environmental conditions. While all PUF constructions are acceptably robust, the arbiter PUF has low entropy while flip-flop and latch PUFs are heavily affected by temperature fluctuations. A drawback for ring oscillators is low min-entropy, while SRAM lacks an exponential input space. However, both ring oscillator and SRAM designs more closely approximate an ideal PUF.

Next, we review the literature on applying PUFs to cryptographic protocols, and developing formal models to evaluate the security of PUF-dependent protocols.

Handschuh et al. give a high level description of how PUFs can be applied to anti-counterfeit and intellectual property domains. The authors outline the shortcomings of existing property protection approaches, which is primarily key storage design. By employing PUFs, the secret key is no longer duplicable, as PUB are by design unclonable.

Rührmair I describe attacks on a variety of PUF constructions, including arbiter and ring oscillator designs. The modeling attacks require only a linear number of challenge response pairs with respect to the structural parameters of the PUF constructions. In constructions where the attacks require superpolynomially many challenge response pairs, the underlying construction grows superpolynomially in the number of components. Thus, the underlying construction becomes infeasible to build, and the designer and adversary face the same asymptotic difficulty. The attacks presented are sufficient to break most PUF constructions in production, and demonstrate that other approaches seem to meet with exponential increases in complexity for both defender and adversary.

Wu et al. demonstrate that a PUF with l-bit input, m-bit output and n components does not implement a random function when $$n < \frac{m2^l}{c}$$

for some constant c. That is, the size of a random function family must be equal to the size of the output domain. Letting $F$ be a function family of PUFs and $Z$ be the output domain, we have that $|Z| = 2^{m2^l}$. However, when $$|F| = n < \frac{m2^l}{c}, \text{ then } |F| = 2\frac{2^{m2^l}}{c} < 2^{m2^l} = |Z|.$$

This information theoretic bound establishes PUFs with $$n < \frac{m2^l}{c}$$

components as a pseudorandom function family. In order for such PUF families to implement a proper psuedorandom family, confusion and diffusion of the input are necessary. The authors show how to construct a physically unclonable pseudorandom permutation by using a PUF to generate the key for a block cipher. Finally, the authors construct a secure helper data algorithm called the majority voting dark bit for error correction that is more efficient than standard soft decision error correcting codes.

Yu II describe a machine learning based rationale for security by considering an adversary's advantage against PUFs with a given classification error. By assuming that a PUF with k bits in the parameter requires at least k challenge-response pairs to gain a classification advantage, the authors conclude that a classification error rate of 0.5 is equivalent to security. Technically, the authors should specify that this result would only apply to PUFs with a single bit output. By removing the assumption that the output of a PUF is independent and identically distributed the complexity of the PUF can be reduced in addition to reducing the complexity of the error correcting code.

Kirkpatrick et al. describe how to use PUFs to generate read-once keys, where upon use the key is immediately destroyed and further use is impossible. Such a construction would facilitate one-time programs as proposed by Goldwasser et al. ("One-time Programs," *Proceedings of the 28th Annual Conference on Cryptology: Advances in Cryptology*, CRYPTO 2008, pages 39-56, Berlin, Heidelberg, 2008, Springer-Verlag). The PUF-ROK construction requires integration with a register that stores an initial seed value, which is the effective security parameter. The PUF and register are in a feedback loop, so upon reading the output of the PUF the initial key is permanently destroyed. The authors also describe how to allow decryption with read-once keys in an arbitrary order. Thus, an effective k-read key can be constructed.

Armknecht et al. give formal security definitions for the desirable properties of a PUF. Existing models did not allow the broad range of PUF constructions to be accurately modeled, for example by requiring the PUF to act as a physical one-way function. With the introduction of PUFs that output only a single bit, inversion becomes trivial. The authors' PUF model requires robustness, physical unclonability and unpredictability, and formal security definitions and games are given to demonstrate that a PUF construction is secure. This facilitates the use of PUFs in cryptographic protocols, where the security of protocols must be reducible to existing hard problems.

Brzuska et al. construct cryptographic protocols for oblivious transfer, bit commitment and key exchange using PUFs in a universally composable framework. The universally composable (UC) framework of Canetti ("Universally Composable Security: A new paradigm for cryptographic protocols," *Proceedings of the 42nd IEEE Symposium, on Foundations of Computer Science*, FOCS'01, Washington, D.C., 2001, IEEE Computer Society) facilitates security proofs of protocols to be derived from sub-protocols in an arbitrary system.

The work of van Dijk et al. improves upon the work of Brzuska et al. by considering more realistic attack scenarios for cryptographic protocols involving PUF devices. Specifically, the authors' new security model focuses on when an adversary has access to the PUF device during a protocol. The authors demonstrate that any protocol for oblivious transfer or key exchange based solely on the use of a PUF is impossible when the adversary has posterior access to the PUF. Similar impossibility results are given for other security models, even when the PUF is modeled as an ideal random permutation oracle. The authors introduce formal security definitions in three models, and give novel protocols for bit commitment, key exchange and oblivious transfer under a subset of these models. Finally, the authors demonstrate that the application of Brzuska et al. to the universally composable framework of Canetti is not valid in these security models, and should be considered an open problem.

SUMMARY OF THE INVENTION

A device authentication system according to one aspect of the present invention includes one or more devices, child servers capable of communicating therewith, and a root server configured to enroll devices by: collecting device-specific tokens and creating a complete verification set ("CVS") therefrom; creating a working verification set ("WVS") by selecting a subset of the CVS; creating a limited verification set ("LVS") by performing a derivation function on at least part of the WVS; and distributing part or all of the LVS to child servers. A device authentication system according to another aspect of the invention is configured such that a PUF-containing device and a server communicating with the device can perform an extended BPV generation. A system according to yet another aspect of the invention includes a device that contains a PUF and is configured to perform error decoding on subsets of an authentication-related value multiple times.

DETAILED DESCRIPTION OF EMBODIMENTS

We review the enrollment and authentication protocols of Frikken et al. The authors consider PUF authentication in the context of banking authentication. The identity of banking clients is proved through a zero knowledge proof of knowledge, which demonstrates that the client knows a password and is in possession of a device capable of generating the discrete logarithm of a pre-enrolled group element. The construction is robust against many forms of attack, including device and server compromise by an adversary. Further, the construction is easily extended to support panic passwords, where authentication succeeds but the banking server is notified that the client was under duress. We build on a subset of the authors' construction in this work, removing the user and focusing only on authenticating the hardware.

We modify their protocol in two ways. First, we reduce the number of necessary modular multiplications, as the PUF itself resides on a resource-constrained device (i.e., a device having a mathematic computational capability that is comparatively significantly less than that of personal computers widely available at the time of comparison). Second, we modify the enrollment algorithm such that it needs to occur only once. Many PUF-based authentication protocols assume a trusted enrollment stage, where the PUF device interacts with a server without adversarial intervention. As re-enrollment is costly, particularly in large-scale deployed systems, we modify the enrollment protocol to account for future failures or the need to generate additional enrollment tokens.

OVERVIEW

Figure 1:
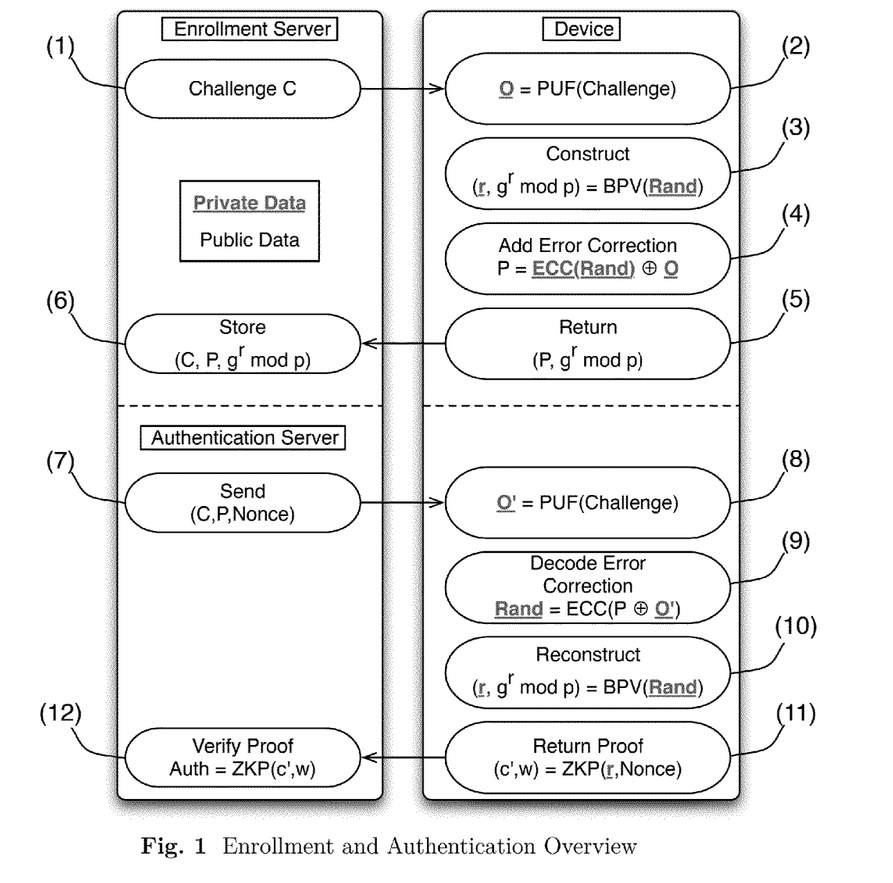
FIG. 1 is an illustration of the core components of the enrollment and authentication algorithms.

Referring to FIG. 1, we first describe the core operations of the present protocols in the context of the primitives used in the construction of the enrollment and authentication protocols of Frikken et al.

The enrollment server issues a random challenge C to the device, which is passed as input to the PUF. Let O denote the response of the PUF to challenge C.

The device chooses a random group element ran $\in G_{p,p}$, and uses the extended BPV generator process (Boyko et al., "Speeding up discrete log and factoring based schemes via precomputations," *Advances in Cryptology EUROCRYPT'98*, vol. 1403 of *Lecture Notes in Computer Science*, pages 221-235, Springer Berlin Heidelberg, 1998) to construct a pair $(r, g^r, \mod p)$ that depends critically on the random group element rand, and substantially reduces the number of modular multiplications necessary to construct $g^r \mod p$.

As the PUF output O is noisy, there is no guarantee that when queried on challenge C in the future, the new output O' will satisfy O'=O. However, it is assumed that O and O' will be t-close with respect to some distance metric (e.g. Hamming distance). Thus, an error correcting code may be applied to the PUF output such that at most t errors will still recover O. We apply error correction over the random group element rand, and blind this value with the output of the PUF O, so that the final helper value $P=ECC(rand) \oplus O$ reveals no information about rand. During recovery, computing the exclusive-or of $ECC(rand) \oplus O \oplus O'$ will return rand whenever O and O' are t-close. This process is referred to as fuzzy extraction, and is described in detail in Section 34.

The pair $(F, g^r \mod p)$ is returned to the enrollment server as a commitment to be used for authenticating the device in the future. Note that neither P nor $g^r \mod p$ need to be kept secret, as without the PUF output O, the private exponent r cannot be recovered.

When a server wishes to verify the device as authentic, it sends the tuple (C, P, Nonce) to the device, acting as the verifier in the zero knowledge proof protocol of Chaum et al. ("An improved protocol for demonstrating possession of discrete logarithms and some generalizations." *Proceedings of the 6th annual international conference on Theory and Application of Cryptographic Techniques*, EUROCRYPT'87, pages 127-141, Berlin, Heidelberg, 1988, Springer-Verlag). On input the challenge C, the device returns an output O'.

The exclusive-or of the PUF output O' and the error corrected helper data P is run through error de coding. So long as O' and the original PUF output O are t-close, the decoding process will successfully recover the random group element rand.

The group element rand is used as input to the extended BPV generator process, which returns a pair (r, $g^r$ mod p).

After recovering the private exponent r, the device constructs the zero knowledge proof response pair (c', w), acting as the prover. The server acts as the verifier in the zero knowledge proof, and accepts the device as authentic if the pair (c', w) satisfies the proof condition.

We now give a formal description of the modeling assumptions about the PUF, as well as each primitive involved in the enrollment and authentication algorithms.

Model

We consider three principal entity types:

A set of servers S, where each server $s_i \in S$ controls authentication of devices on its system.

A set of devices $d_i \in D$, each with an embedded PUF.

An adversary A that wishes to masquerade as a legitimate device $d_i \in D$ to obtain resources stored on some subset of the servers $S' \subseteq S$.

We assume that all entities are bound to probabilistic polynomial-time (PPT). That is, all entities may perform computation requiring polynomially many operations with respect to a global security parameter λ. In our setting, λ refers to the number of bits in the group modulus p. The restriction implies that computation requiring exponentially many operations with respect to λ is not efficient for the agents, and will succeed with only negligible probability.

PUF Device

The specific PUF device used in the construction is of critical importance. Rührmair I define three distinct classes of PUF devices:

1. Weak PUF: A weak PUF is typically used only to derive a secret key. The challenge space may be limited, and the response space is assumed to never be revealed. Typical constructions include the SRAM (Holcomb et al., "Initial SRAM state as a fingerprint and source of true random numbers for RFID tags," In *Proceedings of the Conference on RFID Security*, 2007), Butterfly (Kumar et al., "Extended Abstract: The Butterfly PUF protecting IP on every FPGA," *Hardware-Oriented Security and Trust*, HOST 2008, *IEEE International Workshop*, pages 67-70, 2008) and Coating (Tuyls et al., "Read-proof hardware from protective coatings," *Proceedings of the 8th International Conference on Cryptographic Hardware and Embedded Systems*, CHES'06, pages 369-383, Berlin, Heidelberg, 2006, Springer-Verlag) PUFs.

2. Strong PUF: A strong PUF is assumed to (i) be physically impossible to clone, (ii) impossible to collect a complete set of challenge response pairs in a reasonable time (i.e. on the order of weeks), and (iii) difficult to predict the response to a random challenge.

3. Controlled PUF: A controlled PUF satisfies all of the criteria for strong PUFs, and additionally implements an auxiliary control unit for computing more advanced functionalities.

In our setting, the controlled PUF is the most desirable. Further, we will require that it is physically impossible for an adversary to observe the output of the PUF that is passed to the auxiliary control unit. We assume that only the final output of the auxiliary control unit is ever revealed, and that all intermediate calculations cannot be observed by an adversary.

Formal PUF Definition

Formally, an ideal PUF construction satisfies Definition 1:

Definition 1. A physically unclonable function $P_d: \{0,1\}^{\kappa_1} \to \{0,1\}^{\kappa_2}$ bound to a device d is a function with the following properties:

1. Unclonable: We require that $Pr[dist(y, x) \leq t | x \leftarrow U_{\kappa_1}, y \leftarrow P(x), z \leftarrow P'] \leq \epsilon_1$, the probability of duplicating PUF P with a clone PUF P', such that their output distributions are t-statistically close is less than some sufficiently small $\epsilon_1$.

2. Unpredictable: We require that $Adv_A^P(\kappa_2) := Pr[r=r']$, denoting the probability of the adversary A guessing the correct response r of the PUF P to the challenge c, is negligible in $\kappa_2$ for all probabilistic polynomial time adversaries A.

3. Robust: We require that $Pr[dist(y, z) > t | x \leftarrow U_{\kappa_1}, y \leftarrow P(x), z \leftarrow P(x)] \leq \epsilon_2$, the probability of a fixed PUF P yielding responses t-distant on the same input x is less than some sufficiently small $\epsilon_2$. This property is satisfied by binding the PUF device d with a (m, l, t, $\epsilon_3$) fuzzy extractor (Gen, Rep).

4. Fuzzy Extraction: We require that during the enrollment phase for a PUF d, given a challenge c, the PUF computes $(R, P) \leftarrow Gen(r)$, where $r \leftarrow P_d(c)$ and outputs P. The helper string P allows for R to be recovered when the challenge W' is t-close to the original challenge W.

5. Indistinguishability: We require that the output of the PUF be computationally indistinguishable from a random string of the same length, such that the advantage of a PPT adversary A is $$Adv_A^{PUF-IND}(l) \leq \frac{1}{2} + \epsilon_3,$$

where $\epsilon_3$ is negligible.

Fuzzy Extraction

The output of a PUF device is noisy, and thus varies slightly despite evaluating the same input. In order to generate a fixed value for a given input over this noisy function, a fuzzy extractor is necessary. In our construction, we implement fuzzy extraction in the auxiliary control unit, such that the output is constant for a fixed input. We now formally define the Hamming distance construction of Dodis et al. ("Fuzzy extractors: How to generate strong keys from biometrics and other noisy data," *SIAM J. Comput.*, pages 97-139, March 2008), based on the fuzzy commitment function by Rids et al. ("A fuzzy commitment scheme," *Proceedings of the 6th ACM conference on Computer and Communications Security*, CCS'99, pages 28-36, New York, 1999, ACM), which is used during the enrollment process.

Definition 2. Let C be a binary (n, k, 2t+1) error correcting code, and let $rand \leftarrow \{0, 1\}^k$ be a random k-bit value. Then the following defines a secure sketch for input string O:

$$SS(O; rand) = O \oplus ECC(rand) \tag{1}$$

In FIG. 1, Enrollment Challenge 1 illustrates the enrollment server issuing a random challenge C to the device. The challenge is drawn uniformly at random from $\{0, 1\}^k$ for a k-bit challenge.

Definition 2 is used to build the Gen procedure for the enrollment phase, which must output a set $\langle rand, P \rangle$, where rand is a random value and P is a helper string that is used to recover rand.

Algorithm 1 The Gen Algorithm
  Input: A prime order subgroup q of $\mathbb{Z}_p^*$ where p=2q+1; A challenge c
  O←PUF(c)
  rand←random $\in \mathbb{Z}_p^*$, a random group element
  P←O⊕ECC(rand)
  return ⟨rand, P⟩
  PUF Query 2 illustrates the hardware device querying the PUF on challenge C, and yielding a response O.

Reducing Modular Multiplications

Modular exponentiation is an expensive operation, hindering the implementation of a PUF-based authentication system on resource-constrained devices, for example a mobile device (i.e., a device capable of being conveniently carried in one hand). We have identified a way to exploit a characteristic of the Frikken et al. protocol to adapt a means of reducing the onboard expense of this operation by an order of magnitude.

A protocol used in other contexts for securely outsourcing modular exponentiations to a server was given by Boyko et al., and their approach is typically referred to as utilizing BPV generators. Nguyen et al. ("Distribution of modular sums and the security of the server aided exponentiation," *Cryptography and Computational Number Theory*, vol. 20 of *Progress in Computer Science and Applied Logic*, pages 331-342, 2001) then gave bounds on the distribution of modular sums, and demonstrated how BPV generators can be extended to reduce the computational load on resource-constrained devices to securely perform modular exponentiation with the aid of a server. Chen et al. ("New algorithms for secure outsourcing of modular exponentiations," *Computer Security*, ESORICS 2012, vol. 7459 of *Lecture Notes in Computer Science*, pages 541-556, Springer Berlin Heidelberg, 2012) give methods to perform simultaneous modular exponentiation, and give a more thorough security analysis of their protocols.

Constructing our PUF-based authentication system with enrollment and authentication protocols that do not impose a specific structure on exponents enabled us to successfully adapt extended BPV generators to reduce the computational cost of computing modular exponentiation, as follows:

Parameter Selection: As suggested by the original authors of BPV generators, for a 256-bit prime p the parameters {n=256, k=16} are suggested to maintain the security of the discrete logarithm problem through the corresponding subset sum problem of breaking the BIN generator.

Preprocessing: Generate n random integers $\alpha_1, \ldots, \alpha_n \in \mathbb{Z}_{p-1}$ to serve as exponents under the group $\mathbb{Z}_p^*$. For each j∈[1, ..., n], compute $\beta_j \equiv g^{\alpha_j}$ mod p, where g is the generator for the group $\mathbb{Z}_p^*$. These values are stored in the set P={($\alpha_1$, $\beta_1$), ..., ($\alpha_n$, $\beta_n$)}. This stage is performed by the server, and the database P may be publicly revealed. In our setting, P is stored on the device.

Pair Generation: When a secret pair (x, $g^x$ mod p) is to be generated, a random subset S⊂[1, ..., n] is generated such that |S|=k, 1≤k<n. We then compute:

$$x \equiv \sum_{j \in S} \alpha_j \mod (p-1) \qquad (2)$$

$$X \equiv \prod_{j \in S} \beta_j \mod p \qquad (3)$$

If x≡0 mod (p−1), the set S is randomly regenerated until this equivalence does not hold. The secret pair is then (x, X). Thus, we have constructed the PairGen function, given by Algorithm 2, where ƒ'(•) is defined in Equation 4.

Algorithm 2 The Pair Generation Algorithm
  P={($\alpha_1$, $\beta_1$), ..., ($\alpha_n$, $\beta_n$)}
  $G_{pp}$, a group of prime order
  n, the number of bits in the modulus
  k, the size of the subset
  p, the prime group modulus
  S←random ⊆[1, ..., n]=ƒ'(R) to be kept secret
  x←$\alpha_{S_1}$
  X←$\beta_{S_1}$
  for 1<j≤k do
    x←x+$\alpha_{S_j}$ mod (p−1)
    X←X·$\beta_{S_j}$ mod p
  end for
  return (x, X)

As PairGen(•) outputs a pair (x, X) we denote by PairGen$_x$(•) the output x, and similarly denote by PairGen$_X$(•) the output X=($g^x$ mod p). Note that X need not be private, while the private exponent x must not be revealed.

The use of BPV generators results in a substantial reduction in the number of modular multiplications required to compute a secret pair (x, $g^x$ r mod p). For a 256-bit prime p, the square-and-multiply algorithm requires 1.5n modular multiplications for an n-bit exponent to perform modular exponentiation. Thus, rather than requiring 384 modular multiplications, use of a BPV generator requires only 15, an improvement of an order of magnitude.

In our construction, the device is required to generate a specific pair (X, $g^x$ mod p) that is dependent on the output of the PUF(•) function. In the enrollment protocol (Algorithm 3), the generation function (Algorithm 1) takes as input a challenge c and returns a pair ⟨rand, P⟩ that depends on the output of PUF(c). The value rand is a randomly selected group element of $G_{pp}$, which may be recovered by the PUF when given the same challenge c and the helper string P. Thus, we need the output of PairGen(n, k) to depend critically on the private value rand so that the same pair (x, X) is generated for a fixed challenge. We accomplish this by defining a deterministic function ƒ'(R)↦S for generating the set of indices S from the recovered value rand. Specifically, we define ƒ'(•) as follows:

$$f'(R): \begin{cases} S_1 & : H_1(R) \mod n \\ \ldots & \ldots \\ S_k & : H_n(\ldots H_1(R)) \mod n \end{cases} \mapsto S \qquad (4)$$

Thus, the set of k indices S is generated through a hash chain over R, reduced modulo the total number of pairs, n. In our implementation, H(•) is the SHA-256 hash algorithm. As the group element rand is secret, knowledge of the definition of ƒ'(•) and the complete set P={($\alpha_1$, $\beta_1$), ..., ($\alpha_n$, $\beta_n$)} does not yield an advantage to any probabilistic polynomial-time adversary A. We redefine function PairGen(•, •) to accept the index argument R and a set P={($\alpha_1$, $\beta_1$), ..., ($\alpha_n$, $\beta_n$)}.

Referring still to FIG. 1, BPV Generation 3 illustrates the device choosing a random group element rand $\in G_{pp}$, and using the extended BPV generator process to construct a pair (r, $g^r$ mod p) that depends critically on the random group element rand, which substantially reduces the number of modular multiplications necessary to construct $g^r$ mod p.

Error Correction 4 illustrates the hardware device employing error correction. As the PUF output O is noisy, there is no guarantee that when queried on challenge C in the future, the new output O' will satisfy O'=O. However, it is assumed that O and O' will be t-close with respect to some distance metric (e.g. Hamming distance). Thus, an error correcting code may be applied to the PUF output such that at most t errors will still recover O. We apply error correction over the random group element rand, and blind this value with the output of the PUF O, so that the final helper value P=ECC(rand)⊕O reveals no information about rand. During recovery, computing the exclusive-or of ECC(rand)⊕O⊕O' will return rand whenever O and O' are t-close. This process is referred to as fuzzy extraction.

Enrollment Data Tuple 5 illustrates the hardware device constructing the pair (P, $g^r$ mod p), consisting of helper data P to be used for error decoding, and a commitment $g^r$ mod p to the exponent r. Note that neither P nor $g^r$ mod p need to be kept secret, as without the PUF output O, the private exponent r cannot be recovered.

Store Enrollment 6 illustrates the server storing the hardware device enrollment token (P, $g^r$ mod p) for use in future authentication protocols.

The enrollment phase collects a series of n tokens $\{(c_1, P_1, g^{r_1} \bmod p), \ldots, (c_n, P_n, g^{r_n} \bmod p)\}$ from the PUF device in response to challenge queries by the server. The authentication tokens serve as commitments so that the device can be authenticated in the future. Note that no sensitive information is transmitted over the communication channel or stored in non-volatile memory. The private exponent r is generated by the device, and discarded after construction of $g^r$ mod p. When the exponent r is needed to authenticate the device through a zero knowledge proof protocol, an enrollment token $(c_i, P_i, g^{r_i} \bmod p)$ allows the device to regenerate r and complete the proof. This provides a substantial benefit; over alternative PUF authentication protocols, such as the naïve challenge-response protocol or a PKI construction, as both require private information to be stored in non-volatile memory.

Algorithm 3 describes the enrollment protocol in pseudocode.

Algorithm 3 The Enrollment Algorithm
  for Server s do
    p←2q+1 where p, q∈prime
    g←random ∈$G_{p\,q}$, a random group element
    while $g^{p-1/2}$≡−1 mod p do
      g←random ∈$G_{p\,q}$, a random group element
    end while
  end for
  for 1≤i≤n do
    for Server s do
      $c_i$←random ∈$G_{p\,p}$, a random group element
      Device d←{$c_i$, p, g}
    end for
    for PUF Device d do
      x=H($c_i$, p, g)
      ⟨$R_i$, $P_i$⟩←Gen($f$(x)) where $f$(•) is the PUF function and Gen is Algorithm 1
      $helper_i$=$P_i$
      $token_i$=$g^{r_i}$ mod q=$PairGen_x$($f'(R_i)$, P)
      Server s←{$token_i$, $helper_i$}
    end for
    for Server s do
      Store new enrollment entry {$c_i$, ($g^{r_i}$ mod p), $P_i$}
    end for
  end for Ideally, the enrollment process should be required only once, while the device is in a trusted environment at the manufacturer. Further, this process must ensure that in the event of a security breach, the device can remain active without re-enrollment through a minor change on the server side. We realize this property by constructing a challenge-response tree, where only the root node is directly derived from a PUF response. This minimizes the impact of an adversary succeeding in solving the discrete logarithm problem (e.g., when the modulus is small, as in our current implementation).

To prevent such an attack from forcing a re-enrollment process, we generate derived tokens from those collected during enrollment. Should an adversary succeed in solving the discrete logarithm problem, the recovered exponent will not help an adversary masquerade as the device to a server with a different derived token. The tiered authentication structure is as follows:

Definition 3. The complete verification set (CVS) is defined to be the set $\{(c_1, P_1, g^{r_1} \bmod p), \ldots, (c_n, P_n, g^{r_n} \bmod p)\}$, where $r_i$ is linked to the PUF output through the Rep protocol (Algorithm 4).

The CVS consists of a set of challenges and their associated PUF responses, where the secret $r_i$, known only given access to the PUF, is hidden in the exponent. From this set of root challenge-response pairs, we derive a tree structure for tiered authentication.

Definition 4. The working verification set (WVS) is a subset of the CVS, distinguished by the choice of a single root challenge-response pair $(c_i, P_i, g^{r_i} \bmod p)$, where this pair serves as the root of the authentication tree.

Figure 2:
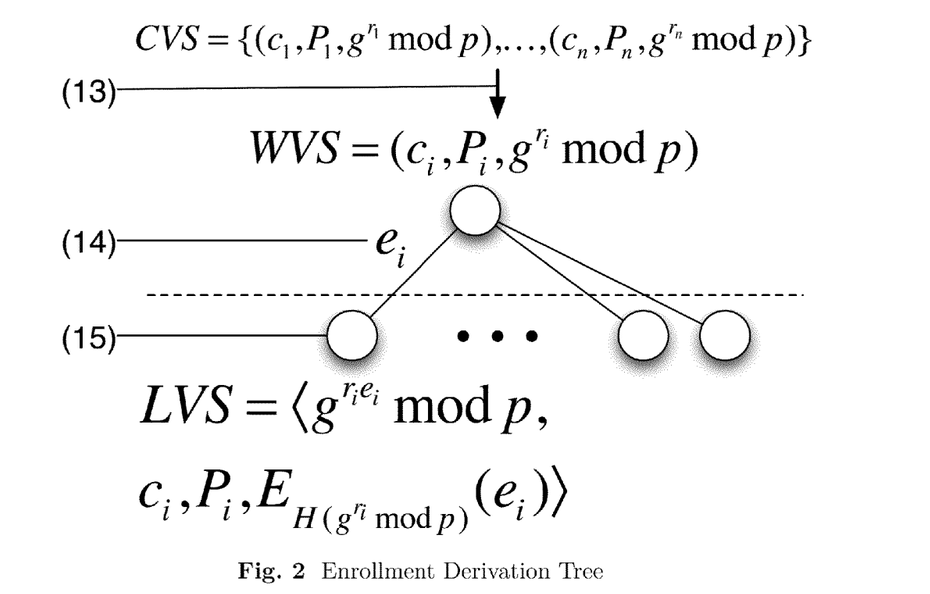
FIG. 2 is an illustration of the derived key tree construction.

In FIG. 2, Working Verification Set 13 illustrates the selection of a member of the complete verification set to serve as the working verification set.

A given WVS chooses a single pair $(c_i, P_i, g^{r_i} \bmod p)$ from the CVS. This pair will serve as the root of the authentication tree. We now describe how child nodes of this root value are derived.

Definition 5. A limited verification set (LVS) is a subset of the WVS, derived from the root node by constructing the authentication set $\langle g^{r_i e_i} \bmod p, c_i, P_i, E_{H(g^{r_i} \bmod_p)}(e_i)\rangle$.

To create a child node, the root node chooses a random value $e_i \in \mathbb{Z}_{p-1}$ and constructs $g^{r_i e_i}$ mod p. This value hides the root node $g^{r_i}$, as the child node cannot decrypt $E_{H(g^{r_i} \bmod_p)}(e_i)$ to recover $e_i$. The encryption function is defined as:

$$E_k(x) = x \oplus k \quad (5)$$

Derived Exponent 14 illustrates the generation of a random exponent $e_i$, which is used to generate the derived token $\langle g^{r_i e_i}$ mod p, $c_i$, $P_i$, $E_{H(g^{r_i} \bmod_p)}(e_i)\rangle$. The random exponent $e_i$ blinds the root exponent $r_i$.

We require that the child node is unable to generate the key, yet the PUF device must be able to decrypt the exponent $e_i$ to successfully prove knowledge of the exponent in the zero knowledge proof. We use $H(g^{r_i} \bmod p)$ as the key, as the PUF can recover $(r_i, g^{r_i} \bmod p)$ using $c_i$ through the Gen protocol (Algorithm 1). The derivation structure for the verification sets is illustrated in FIG. 2.

Derived Enrollment Token 15 illustrates the derived token to be distributed to other servers. The token $\langle g^{r_i e_i}$ mod p, $c_i$, $P_i$, $E_{H(g^{r_i} \bmod_p)}(e_i)\rangle$ allows another server to authenticate the device, while revealing nothing about the root exponent $r_1$. Even if the derived token is compromised (revealing $r_i e_i$), no information about $r_i$ is obtained, which prevents an adversary from masquerading as the hardware device to any server other than the one in possession of $g^{r_i e_i}$ mod p.

By only distributing derived tokens, an adversary A able to solve the discrete logarithm problem recovers only $r_i e_i$ mod (p−1). However, this does not allow A to masquerade as the device with any other server, as each derived exponent $e_i$ is randomly generated. In order to impersonate the device with a different server, A must solve another discrete logarithm problem. Further, recovering a derived exponent $r_i e_i$ yields A no advantage in attempting to recover the root exponent. Rather than forcing a re-enrollment, the root server simply issues a new derived token to the compromised child server.

Returning to FIG. 1, Authentication Challenge 7 illustrates a server attempting to authenticate a hardware device. The server sends the tuple (C, P, Nonce) to the device, acting as the verifier in the zero knowledge proof protocol of Chaum et al.

We now define the Rep procedure such that, on input O' where dist(O, O')≤t, the original PUF output rand may be recovered:

Definition 6. Let D be the decoding scheme for the binary (n, k, 2t+1) error-correcting code ECC, and let O' be an input such that dist(O, O')≤t. Then Rep is defined as:

$$Rep(O', P) = D(P \oplus O')$$
$$= D(O \oplus ECC(rand) \oplus O')$$
$$= rand$$

From Definition 6, we can now describe the Rep algorithm that allows a PUF output O' that differs from the original output O by at most t to reproduce output rand such that Rep(O')=rand using the public helper string P=O⊕ECC (rand):

We use the Gen and Rep algorithms in the Enrollment and

Algorithm 4 The Rep Algorithm

Input: A challenge c, Helper string P
O'←PUF(c)
rand←D(P⊕O')
return rand

Authentication protocols to ensure that the same random value rand is recovered so long as the PUF outputs O, O' differ by at most t bits.

PUF Recovery 8 illustrates the hardware device querying the PUF on challenge C, and returning output O', where O' is not necessarily equal to O. If the device is authentic, verification will succeed when O' differs from O by at most t-bits, where a t-bit error correcting code is used.

Error Correction Removal 9 illustrates the hardware device removing the error correction to recover the random group element. The exclusive-or of the PUF output O' and the error corrected helper data P is run through error decoding. So long as O' and the original PUF output O are t-close, the decoding process will successfully recover the random group element rand.

BPV Regeneration 10 illustrates the hardware device using the group element rand as input to the extended BPV generator process, which returns a pair $(r, g^r \bmod p)$.

Zero Knowledge Proof 11 illustrates the hardware device constructing a zero knowledge proof receipt. After recovering the private exponent r, the device constructs the zero knowledge proof response pair (c', w), acting as the prover.

Verify Zero Knowledge Proof 12 illustrates the server attempting to verify the zero knowledge proof receipt (c', w). The server acts as the verifier in the zero knowledge proof, and accepts the device as authentic if the pair (c', w) satisfies the proof condition.

The authentication phase allows a server to verify that a client device is authorized to issue a request. Upon receiving a request from a device, the server engages in Chaum et al.'s zero knowledge proof protocol with the device d to establish permission to perform the request. The protocol is given as pseudocode in Algorithm 5.

Implementation

Figure 3:
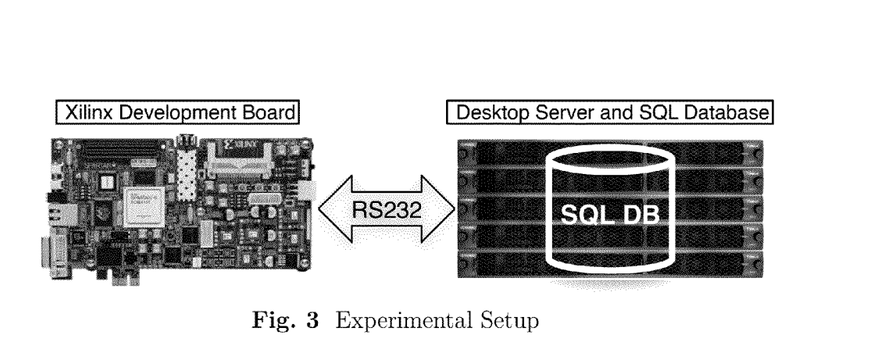
FIG. 3 is an illustration of our experimental setup.

As seen in FIG. 3, we implemented our protocol on a Xilinx Spartan 6 FPGA SP605 development board as a proof of concept. One of ordinary skill will readily recognize how to adapt the hardware modular math engine to accept larger moduli, preferably at least 1024 bits. Both the PUF and modular math engine reside in the FPGA fabric, while all other operations were performed in software using the MicroBlaze processor. The device communicates with a desktop server

---

Algorithm 5 The Authentication Algorithm for PUF Device d do
    Server s ← request
end for
for Server s do
    Device d ← {c, g, p, P, N} where N is a nonce and P is the helper string
end for
for PUF Device d do
    x ← H (c, g, p)
    R ← Rep(f (x), P) where f (·) is the PUF output function and Rep is Algorithm 4
    $v_{par}$ ← random ∈ $G_p$, a random group element
    v ← PairGen$_x$(f ($v_{par}$), P)
    w ← v − c' (r = PairGen$_x$(f (R),P)) mod p
    t' ← $g^v$ mod p = PairGen$_x$ (f($v_{par}$), P)
    c' ← H (g , $g^r$ mod p = PairGen$_x$(f(R), P), t', N)
    Server s ← {c', w}
end for
for Server s do
    t' ← $g^w g^{rc'}$ mod p
    h ← H (g, $g^r$, $g^w g^{rc'}$ mod p, N)
    Device d ← $\begin{cases} \text{accept: c'} = h \\ \text{deny: c'} \neq h \end{cases}$
end for

--- over an RS232 connection. The enrollment and authentication protocols for the device and server were written in C, with a Java front end on the server side for the user interface and communicating with a local SQL database.

Error Correcting Code

Figure 4:
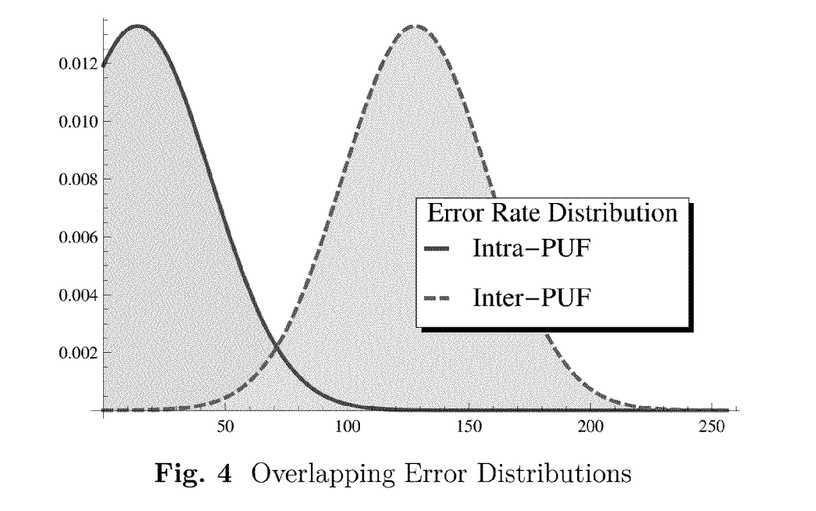
FIG. 4 is an illustration of overlapping intra- and inter-PUF error rate distributions.
Figure 5:
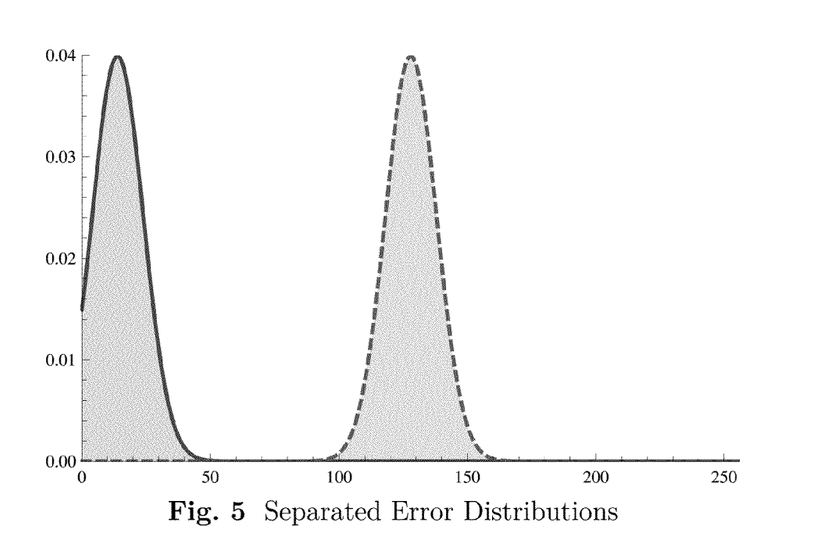
FIG. 5 is an illustration of separated intra- and inter-PUF error rate distributions.
Figure 6:
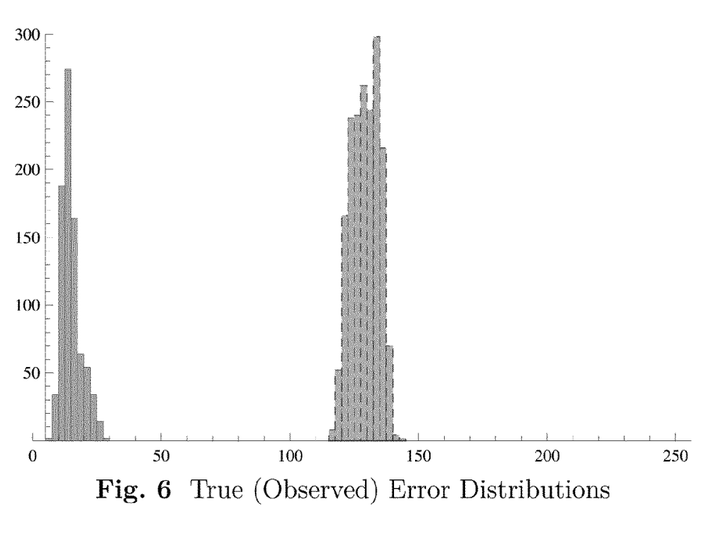
FIG. 6 is an illustration of the experimentally observed intra- and inter-PUF error rate distributions.

Ideally, the inter-PUF error rate between two separate PUFs on the same challenge should be approximately 50%, while the intra-PUF error rate on a challenge should be substantially less. The greater the distance between these two distributions, the less likely false positives and false negatives are to occur. FIG. 4 illustrates the possible relationship between the inter-PUF and intra-PUF error in the case where the distributions overlap, making it impossible to avoid false positives and false negatives. FIG. 5 illustrates more distant distributions, where establishing a boundary to minimize false positives and false negatives is simpler. Finally, FIG. 6 illustrates the true inter-PUF and intra-PUF error rates we observed experimentally using three Xilinx development boards. The observed inter-PUF error rate has ($\mu$=129, $\sigma$=5), which satisfies the ideal error rate of approximately half of the output bits differing. The observed intra-PUF error rate has ($\mu$=15, $\sigma$=4).

Error decoding is the most computationally expensive operation that must be performed on the device. Our implementation chose a (n, k, 2t+1) BCH code (Bose et al., "On a class of error correcting binary group codes," *Information and Control*, pages 68-79, 1960), where the code has length n, accepting original data of length at most k and correcting at most t errors. As we extract 256 bits from the PUF, originally a (1023, 668, 73) BCH code was used, so that up to 36 errors could be corrected. However, the PUF itself has only 32 bits, so to extract 256 bits the PUF is queried eight times. Rather than perform error correction over the 256 bit concatenated output, we use a (127, 71, 17) BCH code over each 32 bit output block. This change substantially reduces the size of the generating polynomial, which improved decoding speed despite having to run eight times, rather than once.

A benefit of this change is that a total of 64 bits may now be corrected in the PUF output while simultaneously reducing the decoding time. This comes at the price of only being able to correct 8 errors per 32-bit block, as the error correction code is now defined for block sizes of 32 bits, rather than 256 bits. Thus, the error correcting code handling up to 64 errors is likely to capture all of the intra-PUF error without introducing false positives by "correcting" inter-PUF error. On the other hand, while this gives the appearance of a 256-bit function, its security is equivalent to a brute force search over $2^{32}$ elements. Thus, rather than attack a presumed 256-bit function, an adversary with some knowledge of the system could attack a 32-bit permutation and combine each smaller challenge-response pair block to generate the full PUF mapping. Consequently, it would be preferred to use a PUF accepting a 1024-bit input in a deployed system.

We experimentally determined the total time necessary for each operation, including storage and retrieval of values from a SQL database on the server, and communication between the device and the server. The server is equipped with an 8-core 3.1 GHz processor and 16 GB of RAM. Table 1 reports the average time per protocol over 1000 trials.

TABLE 1

Performance Results

| Protocol | Average Runtime | St. Dev. |
|---|---|---|
| Enrollment | 1.2791 seconds | 0.0603 |
| Authentication | 1.3794 seconds | 0.0602 |
| Derived Authentication | 1.4480 seconds | 0.0620 |

We note that all experiments had a 0% false positive and false negative rate. By setting the maximum error correction threshold at 64 bits, we are able to perfectly distinguish between PUF devices. However, in a deployed system, environmental factors may affect the intra-PUF error rate. If the intra-PUF error rate increases beyond the error correction threshold, the introduction of false negatives is inevitable.

A frequent concern about deploying PUFs in large scale authentication systems is that they may not be robust to varying environmental conditions. As the PUF hardware ages, the number of errors present in the responses is expected to increase. Maiti et al. ("The impact of aging on an FPGA-based physical unclonable function," *Field Programmable Logic and Applications (FPL)*, 2011 *International Conference,* pages 151-156) study the effects of simulated aging on PUF hardware by purposefully stressing the devices beyond normal operating conditions. By varying both temperature and voltage, the authors were able to show a drift in the intra-PUF variation that, over time, will lead to false negatives. We mitigate this inevitable drift by choosing the error correction threshold to maximize its distance from both the intra- and inter-PUF error distributions.

In authentication systems, false negatives tend to be less damaging than false positives. Maiti et al. note that the error drift strictly affected the intra-PUF error rate distribution. Thus, there is a tendency for intra. PUF error rates to drift towards the maximum entropy rate of 50%. This inevitability should be considered when determining the re-enrollment cycle or the device lifespan.

What is claimed is:

1. An authenticatable device for use with an authentication system, comprising:
   a. a physically-unclonable function ('PUF') device having a PUF input and a PUF output and constructed so as to, in response to the input of a specific challenge C, generate an output O that is characteristic to the PUF and the specific challenge C;
   b. a processor having a processor input that is connected to the PUF output, the processor configured to:
      i. in response to the receipt of an output O from the PUF output, generate a commitment value that depends upon a private value r; and
      ii. in response to the contemporaneous receipt of an authentication query that includes a nonce and of an output O from the PUF output, return a zero knowledge proof authentication value that corresponds to the commitment value;
   wherein the zero knowledge proof authentication value further corresponds to an authentication token that includes a blinded value that depends upon the private value r and a random value, and wherein the processor is configured to decrypt the random value.

2. The authenticatable device of claim 1, wherein the random value is generated externally from the authenticatable device and the processor is configured to decrypt the random value using a key.

3. The authenticatable device of claim 1, wherein the processor is configured to, during generation of the commitment value, generate and discard the private value r.

4. The authenticatable device of claim 1, wherein the commitment value is an exponential function of the private value r.

5. The authenticatable device of claim 1, wherein the blinded value depends exponentially upon the private value r multiplied by the random value.

6. The authenticatable device of claim 1, wherein the commitment value is an exponential function of the private value r and wherein the blinded value depends exponentially upon the private value r multiplied by the random value.

7. The authenticatable device of claim 1, wherein the random value is an element of a group of prime order.

8. The authenticatable device of claim 1, wherein the authentication system has a working verification set that includes the specific challenge C and commitment value.

9. The authenticatable device of claim 1, wherein the authentication system has a working verification set that includes the specific challenge C and commitment value and has a limited verification set that includes the specific challenge C and a corresponding token.

10. The authenticatable device of claim 1, wherein the authentication system includes: a root server having a working verification set that includes the specific challenge C and commitment value; and a child server having a limited verification set that includes the specific challenge C and a corresponding token.

11. The authenticatable device of claim 1, wherein the authentication system includes: a root server having a working verification set that includes the specific challenge C and commitment value; and a plurality of child servers each having a different limited verification set; wherein each limited verification set includes the specific challenge C and a corresponding token that is specific to the particular child server.

12. The authenticatable device of claim 1, wherein the processor is further configured to, in response to the receipt of an output O from the PUF output, generate an error-correcting helper string along with the commitment value.

13. The authenticatable device of claim 1, wherein the PUF device is a controlled PUF device.

14. The authenticatable device of claim 1, wherein the PUF device is a super high information content PUF.

15. The authenticatable device of claim 1, wherein the processor is further configured to perform operations as part of an extended Boyko-Peinado-Venkatesan generation.

16. An authenticatable device for use with an authentication system that includes a root server having a working verification set and a child server having a limited verification set, the authenticatable device comprising:
  a. a physically-unclonable function ('PUF') device having a PUF input and a PUF output and constructed so as to, in response to the input of a specific challenge C, generate an output O that is characteristic to the PUF and the specific challenge C;
  b. a processor having a processor input that is connected to the PUF output, the processor configured to:
    i. in response to the receipt of an output O from the PUF output, generate a commitment value that depends upon a private value r; and
    ii. in response to the contemporaneous receipt of an authentication query that includes a nonce and of an output O from the PUF output, return a zero knowledge proof authentication value that corresponds to the commitment value;
  wherein the working verification set includes the specific challenge C and commitment value and the limited verification set includes the specific challenge C and a corresponding derived token that includes a blinded value that depends upon the private value r blinded with a random value, wherein the zero knowledge proof authentication value further corresponds to the derived token, and wherein the processor is configured to decrypt the random value.

17. The authenticatable device of claim 16, wherein the random value is generated externally from the authenticatable device and the processor is configured to decrypt the random value using a key.

18. The authenticatable device of claim 16, wherein the processor is configured to, during generation of the commitment value, generate and discard the private value r.

19. The authenticatable device of claim 16, wherein the commitment value is an exponential function of the private value r.

20. The authenticatable device of claim 16, wherein the blinded value depends exponentially upon the private value r multiplied by the random value.

21. An authenticatable device for use with an authentication entity, comprising:
  a. a physically-unclonable function ('PUF') device having a PUF input and a PUF output and constructed so as to, in response to the input of a specific challenge C, generate an output O that is characteristic to the PUF and the specific challenge C;
  b. a processor having a processor input that is connected to the PUF output and connectable to the authentication entity and a processor output that is connectable to the authentication entity, the processor configured to:
    i. in response to the receipt of an output O from the PUF output, generate a commitment value that depends upon a private value r; and
    ii. in response to the contemporaneous receipt of an authentication query that includes a nonce and of an output O from the PUF output, perform operations as part of an extended Boyko-Peinado-Venkatesan generation and return a zero knowledge proof authentication value that corresponds to the commitment value.

22. The authenticatable device of claim 21, wherein the processor is further configured to receive preprocessed exponents from the authentication server and employ those exponents in extended Boyko-Peinado-Venkatesan generation.

23. The authenticatable device of claim 21, wherein the processor is further configured to perform operations including the input and processing of a hash chain.

24. The authenticatable device of claim 21, wherein the authenticatable device is resource-constrained.

25. The authenticatable device of claim 21, wherein the authenticatable device is a mobile device.

26. The authenticatable device of claim 21, wherein the processor is further configured to, in response to the receipt of an output O from the PUF output, generate a helper string along with the commitment value.

27. An authenticatable device for use with an authentication entity, comprising:
  a. a physically-unclonable function ('PUF') device having a PUF input and a PUF output and constructed so as to, in response to the input of a specific challenge C, generate an output O that is characteristic to the PUF and the specific challenge C;
  b. a processor having a processor input that is connected to the PUF output and connectable to the authentication entity and a processor output that is connectable to the authentication entity, the processor configured to:
    i. in response to the receipt of an output O from the PUF output, generate a commitment value and a helper string that depend upon a private value r; and
    ii. in response to the contemporaneous receipt of an authentication query and of an output O from the PUF output, generate a full block value based on the output O, break the full block value into a plurality of subparts, carry out error-correcting code on each of the subparts, and return a zero knowledge proof authentication value that corresponds to the commitment value.

28. The authenticatable device of claim 27, wherein the error-correcting code is Bose-Chaudhuri-Hocquenghem ('BCH') code.

29. The authenticatable device of claim 27, wherein the authenticatable device is resource-constrained.

30. The authenticatable device of claim 27, wherein the authenticatable device is a mobile device.

* * * * *